United States Patent [19]
Emmons et al.

[11] Patent Number: 4,588,788
[45] Date of Patent: May 13, 1986

[54] REACTIVE DILUENTS FOR POLYEPOXIDES

[75] Inventors: William D. Emmons, Huntingdon Valley; Charles E. Warburton, Jr., Ambler, both of Pa.

[73] Assignee: Rohm and Haas Company, Philadelphia, Pa.

[21] Appl. No.: 727,636

[22] Filed: Apr. 26, 1985

[51] Int. Cl.$^4$ ............................................. C08F 283/10
[52] U.S. Cl. .................................... 525/531; 525/530; 525/532
[58] Field of Search .................... 525/530, 531, 532

[56] References Cited
U.S. PATENT DOCUMENTS 3,868,410  2/1975  Horlenko et al. .................... 560/205
4,187,382  2/1980  Cowherd et al. .................... 560/185
4,187,383  2/1980  Cowherd et al. .................... 560/185
4,200,705  4/1980  Davis ................................. 525/530

FOREIGN PATENT DOCUMENTS 160747  12/1980  Japan .

Primary Examiner—Allan M. Lieberman
Assistant Examiner—Robert E. L. Sellers
Attorney, Agent, or Firm—Douglas E. Winters; Alex R. Sluzas

[57] ABSTRACT

Curable compositions are prepared from a blend of a polyepoxide, the esterification product of a mixture of carboxylic acids of the formula $CH_2=CHCO_2(CH_2CH_2CO_2)_nH$ (AOnPA herein), where the number average value of n is greater than about 0.1, and a mono- or polyhydric hydroxy-functional compound, and an aliphatic amine curing agent. Use of the esterification product as a reactive diluent for the polyepoxide gives coating and adhesive compositions with reduced toxicity.

10 Claims, No Drawings

REACTIVE DILUENTS FOR POLYEPOXIDES

The present invention relates to the epoxy coatings and adhesives art. Curable compositions are prepared from a blend of a polyepoxide, the esterification product of a mixture of carboxylic acids of the formula $CH_2=CHCO_2(CH_2CH_2CO_2)_nH$ (AOnPA herein), where the number average value of n is greater than about 0.1, and a mono- or polyhydride hydroxy-functional compound, and an aliphatic amine curing agent. Use of the esterification product as a reactive diluent for the polyepoxide gives coating and adhesive compositions with reduced toxicity and greater toughness.

1. Field of the Invention

This invention relates to esters of beta-acryloxypropionic acid and other Michael addition homopolymers of acrylic acid and to the use of these esters as reactive diluents for polyepoxide curable compositions. These compositions may be employed, for example, as adhesives or coatings. This application is a continuation-in-part of U.S. Ser. No. 329,857, filed Dec. 11, 1981 and assigned to the same assignee.

2. Description of the Prior Art

Preparation of the homopolymer of acrylic acid has been described in *Polymer Letters Edition*, Vol. 14, pgs. 277–281 (1976); *Macromolecules*, Vol. 7, pgs. 256–258, (1974); U.S. Pat. No. 3,888,912; and European Patent 3045. The European Patent and U.S. Pat. No. 4,048,259 disclose the use of a homopolymer acid and adhesives and U.S. Pat. Nos. 3,266,930 and 4,048,259 disclose its use in coatings as well.

Yuki et al. (Japanese unscreened patent publication No. 160747/1980) discloses novel di- and triesters of beta-acryloxypropionic acid of the formula $(CH=CHCO_2CH_2CH_2CO_2)_n—Z$ wherein Z may be and n is 2 when Z is any of (1) through (3), inclusive or n is 3 when Z is (4).

Yuki's ester compositions may contain traces of monoesters because of incomplete esterification. The beta-acryloxypropionic acids of Yuki are liquids at room temperature while the corresponding esters of acrylic acid and methacrylic acid are solid at room temperature. These prior art solids are known to be useful in various applications; however, the fact that they were solids made handling them inconvenient at best, and at worst, forclosed their use as reactive diluent.

Cowherd et al., U.S. Pat. Nos. 4,187,382, teaches a method of preparing low color acrylate diesters of organic diols.

Cowherd et al., U.S. Pat. No. 4,187,383, discloses another process for producing low color acrylate diesters employing a critical low esterification temperature and special low color polymerization inhibitors, which are effective at the critical low temperature.

McWhorter, U.S. Pat. No. 4,051,195, discloses curable compositions made from a blend of epoxide resin and a polyacrylate or a polymethacrylate ester which cure rapidly even at low temperatures when mixed with aliphatic polyamines and which are useful in coating in adhesive applications.

European patent application Ser. No. 82/306,535, published June 22, 1983, discloses esters of beta-acryloxypropionic acid and Michael addition homopolymers of acrylic acid, polymers of the esters and applications where the monomers and polymers, such as in the formulations for coatings, binders and adhesives. The use of these esters is reactive diluents and coatings compositions is taught.

Epoxy resins are often diluted to reduce viscosity. This allows for easier handling and impregnation, better substrate wetting, higher filler tolerance and fewer bubbles. Both non-reactant diluents, such as dibutyl phthalate, and reactive diluents such as butyl glycidyl ether are used. Diluents frequently tend to reduce performance properties, so that it is necessary to choose the diluent and its level such that a satisfactory balance is struck. Butyl glycidyl ether is widely used. However, like most low molecular weight epoxy resins, it is suspected of having adverse toxological properties. It would be desirable to eliminate such diluents, but higher molecular weight diluents are less efficient and consequently more expensive to use. This invention provides reactive diluents for epoxy resin based coatings and adhesives with reduced toxicity and surprisingly enhanced toughness over prior art systems containing acrylate or methacrylate ester-based diluents such as those taught by McWhorter.

SUMMARY OF THE INVENTION

This invention relates to curable compositions useful for coatings and adhesives. In particular this invention relates to curable epoxy resin compositions containing reative diluents. The reactive diluents employed is the esterification product of a mixture of ethylenically unsaturated carboxylic acids of the formula $CH_2=CHCO_2(CH_2CH_2CO_2)_nH$, where the number average value of n is greater than about 0.1, and at least one hydroxy-functional compound. The hydroxy-functional compound may be mono- or polyhydric, and may be a ($C_1$–$C_8$) alkanol or a hydroxy-functional vinyl addition monomer such as a hydroxy-functional acrylate or methacrylate. The compositions contain an aliphatic amine curing agent. The present invention provides reactive diluents which yield compositions which exhibit surprising toughness when cured in comparison with epoxy compositions diluted with prior art reactive diluents. This invention also provides reactive diluents for epoxy resins which significantly increase adhesive bond strength. This invention provides a curable coating or adhesive composition comprising (1) a blend of at least one polyepoxide and the esterification product of a mixture of ethylenically unsaturated carboxylic acids of the formula $CH_2=CHCO_2(CH_2CH_2CO_2)_nH$, where the number average value of n is greater than about 0.1, and at least one hydroxy-functional compound selected from the mono- and polyhydroxy-functional compounds, wherein the ratio of esterification product to polyepoxide is from about 5:100 to 1:1 by weight, and (2) an aliphatic amine curing agent containing at least three amine hydrogens per molecule, wherein the amount of said curing agent is such that there are about 0.75 to 1.25 amine hydrogen atoms for each epoxy group of said polyepoxide and for each unsaturated acryl group of said esterification product.

DETAILED DESCRIPTION

The alpha, beta-ethylenically unsaturated acids of the ester monomers of this invention have the structure $$CH_2=CHCO_2(CH_2CH_2CO_2)_nH, \qquad \text{(Formula I)}$$

wherein the number average value of n, n, is 0.1 or greater, preferably between about 0.4 and about 10 and more preferably between about 0.9 and about 5. These acids are prepared conveniently by the Michael addition reaction of acrylic acid to itself, the degree of addition determining the value of n. As is the case with most polymers, the degree of polymerization is conveniently characterized by the average value of n; samples of the polymer will normally have a low degree of polymerization and are thus properly described as oligomers. These oligomers consist of mixtures of individual molecules having the above chemical formula; when individual molecules are being denoted, n must have integral values. When n is 0, the structure is acrylic acid, which is well known, as are its esters. The acid molecule where n equals 1 is also known as beta-acryloxypropionic acid. This acid, when pure, is represented by Formula I with n−1, for the value of n for every molecule in this sample is 1; thus the average value is also 1. This pure acid is an acid component of certain esters of this invention. The abbreviation "AOnPA" may be used to refer to a mixture of acids of Formula I. The esterification product of AOnPA may be referred to as "AOnPAte." Materials other than acrylic acid may be used to prepare the AOnPA which is used to prepare the esters and polymers of this invention, but a preparation starting with acrylic acid is preferred and the use of AOnPA as the intermediate is also preferred. It is known that samples of acrylic acid spontaneously undergo the Michael addition reaction to a small degree so that, after standing for a protracted period, they contain traces of AOnPA.

The ester monomers of the present invention are esters of AOnPA and at least one hydroxy-functional compound. In addition to these esters the esterification product, that is, the product of the esterification reaction between the AOnPA and the hydroxyl-functional compound, may contain unreacted starting material. The hydroxy-functional compound may be a monohydroxy-functional compound or a polyhydroxy-functional compound. Alkanols such as the ($C_1$–$C_8$) alkanols may be used as monohydroxy-functional compounds and employed in preparing the esterification product. Examples of alkanols which may be used include methanol, ethanol, n-propanol, sec-propanol, tert-butanol, n-butanol, sec-butanol, and 2-ethylhexanol. Hydroxy-functional vinyl addition monomers may also be employed. Hydroxy-functional vinyl addition monomers such as hydroxy-functional alkyl acrylates and methacrylates may be used. Examples of hydroxy-functional alkyl acrylates and methacrylates include 2-hydroxyethyl acrylate, 2-hydroxyethyl methacrylate, 3-hydroxypropyl methacrylate, 3-hydroxypropyl acrylate, and 2-hydroxypropyl methacrylate. In one embodiment the esterification product includes monoesters of AOnPA wherein the alcohols are polyols. Thus the ester has both ethylenic unsaturation and a hydroxy-functional group. Preferably the polyol is hydrocarbenyl diol and more preferably the hydrocarbenyl diol is ethylenyl or propylenyl.

In another embodiment the AOnPAte is a polyester of AOnPA and a polyol. The polyol may be a hydroxy-substituted hydrocarbon such as ethylene glycol, 1,3-butylene glycol, neopentyl glycol, 1,4-butane diol, or propylene glycol. The ester may also be the addition product of AOnPA and an epoxide, such as bisphenol A epoxide or an epoxidized oil, the product being hydroxy-functional AOnPAte.

The following comments regarding the chemical and physical properties of monomers and polymers of this invention are not to be regarded as proven facts but are consistent with our understanding of these materials and are pedagogical aids in teaching how these materials achieve certain objects of the invention. In many cases, acrylates and methacrylates offer what appear to be simpler routes to the type of functionality achievable with the AOnPAtes of this invention. However, among the differences, it is found that the AOnPAtes are especially less volatile and may be less toxic than the acrylate and methacrylate analogs. The AOnPAtes have lower volatility than the corresponding acrylate and methacrylate materials. Simple methods to decrease the volatility of the acrylics such as by the introduction of alkoxyether units between the alcohol and the acid give materials with the undesirable properties of the ether units; similar situations exist with other materials such as thioethers, amides and amines. The ether and the other units bind water more strongly than the ester linkage in the AOnPAte, and thus can be expected to be more water sensitive. The polarity of hydrogen bonding capacity which lead to the water swellability also lead to increasing sensitivity to various types of solvents particularly so-called strong solvents.

Certain of the physical property differences between the AOnPAtes and the acrylates are advantageous, particularly in industrial practice. An example is the relative softness or ease of liquification of the AOnPAtes. For instance, pentaerythritol tetracrylate is a solid whereas the tetra-AOnPAte is a liquid and thus easily handled and incorporated into liquid formulations.

Mono-AOnPAtes: Among the esters useful herein are those derived from monofunctional alcohols including linear and branched aliphatic alcohols with 1–36 carbon atoms and in particular, 1–8 carbon atoms, acyclic aliphatic alcohols with 3–36 carbon atoms (e.g. cyclohexanol, 3,3,5-trimethylcyclohexanol, dicyclopentenyl alcohol, etc.), hydroxy-functional aromatics (e.g. phenol, naphthol, etc.) and their ethoxylates or propylates, alcohols with alkylaryl group (e.g. benzyl alcohol, 2-phenylethanol, furfurol, etc.), allylic alcohols (e.g. allyl alcohol, 2-methyl-2-propen-1-ol, 2-allyloxyethanol, 2-(2-allyloxyethoxy)ethanol, 2-buten-1-ol, etc.), hydroxyl-functional ethers (e.g. 2-methoxyethanol, 2-ethoxyethanol, 2-butoxyethanol, 2-phenoxyethanol, 2-(2-methoxyethoxy)-ethanol, 2-(2-ethoxyethoxy)-ethanol, 2-(2-butoxyethoxy)ethanol, 2-(2-hexoxyethoxy)ethanol, the corresponding ethers derived from diethylene glycol, triethylene glycol, tetraethylene glycol, propylene glycol or dipropylene glycol, dicyclopentenyloxyethanol, etc.) hydroxyl-functional esters (e.g. 2-hydroxyethyl acrylate and methacrylate, 2-hydroxypropyl acrylate and methacrylate, 3-hydroxypropyl acrylate and methacrylate, 4-hydroxybutyl acrylate and methacrylate; ethyl 2-hydroxypropanoate, butyl 2-hydroxypropanoate, etc.), hydroxyl-functional acids (e.g. 1,2-hydroxystearic acid, lactic acid, etc.), hydroxyl-functional aldehydes (e.g. 5-hydroxypentanal, 2,2-dimethyl-3-hydroxypropanal, 2-hydroxymethyl-2-methylbutanal, 2-hydroxymethyl-2-methylpentanal, 2-ethyl-2-hydroxymethylhexanal, 3-hydroxy-2,2,4-trimethylpentanal, etc.), hydroxyl-functional ketones (e.g. 4-hydroxy-4-methyl-2-pentanone, haloalcohols (e.g. 2-chloroethanol, 2-bromo-ethanol, etc.), aminoalcohols (e.g. N,N-dimethylethanolamine, N-(2-hydroxyethyl)-piperdine, etc.), N-methylolamides, N-methylolureas, N-methylolhydantoins, N-methylolimides, and the like, and N-(2-hydroxyethyl)- or N-(2-hydroxypropyl)-derivatives of amides, ureas, hydantoins, imides, etc.

Also of use are monoesters of common polyols, especially 2-hydroxyethyl beta-acryloxypropionate, 2-hydroxypropyl beta-acryloxypropionate, and the corresponding esters of higher oligomeric homologues of beta-acryloxypropionic acid obtained either by direct esterification with the appropriate diols (e.g. ethylene glycol or propylene glycol) or, preferably, by reaction with the requisite alkylene oxides (e.g. ethylene oxide or propylene oxide) using techniques well known to those skilled in the art. Monoesters of other diols, triols, and higher polyols are similarly useful.

Poly(AOnPAtes): Among the poly-vinyl functional esters of use are those derived by esterification of common diols (e.g. ethylene glycol, diethylene glycol, triethylene glycol, tetraethylene glycol, 1,2-propanediol, 1,3-propanediol, dipropylene glycol, 2,2-dimethyl-1,3-propanediol, 2,2,4-trimethyl-1,3-pentanediol, di(hydroxyethyl)- and di(hydroxypropyl)-adipate, azelate, dodecanoate, maleate and fumarate, 1,3-butanediol, 1,4-butanediol, 2-buten-1,4-diol, 2-butyn-1,4-diol, 1,5-pentanediol, 1,6-hexanediol, 1,2-cyclohexanedimethanol, 1,3-cyclohexanedimethanol, 1,4-cyclohexanedimethanol, 1,2-cyclohexanediol, 1,3-cyclohexanediol, 1,4-cyclohexanediol, 1,7-heptanediol, 1,8-octanediol, 2-ethyl-1,3-hexanediol, 1,9-nonanediol, 1,10-decanediol, 1,12-dodecanediol, 4,4'-isopropylidenediphenol and its ethoxylates or propoxylates, 2,2'-thiodiethanol, 3,3'-thiodipropanol, N-methyl-diethanolamine, N-ethyldiethanolamine, N-butyldiethanolamine, N-phenyldiethanolamine, N-methylol-, N-(2-hydroxyethyl)-, or N-(2-hydroxypropyl)-derivatives of bisamides, ureas, hydantoins, etc.), triols (e.g. glycerol, 2-ethyl-2-(hydroxymethyl)-1,3-propanediol, 1,1,-tris(hydroxymethyl)ethane, or their ethoxylates and propoxylates, triethanolamine, N-methylol-, N-(2-hydroxyethyl)-, or N-(2-hydroxypropyl)-derivatives of guanamines, melamine, cyanuric acid, etc.), tetrols (e.g. pentaerythritol, N-methylol-, N-2-hydroxyethyl)-, or N-2-(hydroxypropyl)-derivatives of guanamines, melamine, etc.), hexols (e.g. dipentaerythritol, sorbitol, N-methylol-, N-(2-hydroxyethyl)- or N-(2-hydroxypropyl)-derivatives of melamine, etc.), and octols (e.g. tripentaerythritol).

AOnPAs: Beta-acryloxypropionic acid and higher oligomeric homologues used in this invention can be prepared by any of a variety of methods including (1) addition of acrylic acid to beta-propiolactone (2) reaction of acrylic acid or acryloyl chloride with 3-hydroxypropionic acid, or (3) thermal dimerization/oligomerization of acrylic acid either with or without added catalysts. Beta-acryloxypropionic acid is preferably admixed in varying proportions with higher oligomeric homologues. For some applications, it is advantageous to employ only the higher oligomeric homologues. In all cases, however, the acid(s) used herein are of commercial grade and therefore contain small quantities of acrylic acid as an impurity unless otherwise specified.

Preparation of AOnPAtes: The esters of this invention can be synthesized by any of the well known procedures described in the literature including direct esterification, transesterification, acrylation of an alcohol via the carboxylic acid chloride, anhydride, or mixed anhydrides, and, of course, other related methodologies.

In direct esterification, the reaction can be effected at temperatures ranging from 20° C. to 200° C., preferably 50° C. to 150° C., at atmospheric, subatmospheric, or superatmospheric pressure, in the presence of one or more acid esterification catalysts of which sulfuric acid, hydrochloric acid, phosphoric acid, boric acid, methanesulfonic acid, benzenesulfonic acid, naphthalenesulfonic acid, paratoluenesulfonic acid, and the like, are illustrative examples. Catalysts are generally employed at levels of 0.1 to 20 mole %, preferably 0.5 to 10 mole%.

It is also desirable to use a vinyl polymerization inhibitor or inhibitors during the reaction, at concentrations ranging from 50 ppm to 10,000 ppm, preferably 100 ppm to 5000 ppm, based on the weight of acid substrate. Among suitable inhibitors are hydroquinone, resorcinol, pyrocatechol, and the like, lower alkoxy-substituted phenolics or lower alkylated alkoxyphenolics having up to ten carbon atoms in the alkyl or alkoxy groups (e.g. monomethyl ether of hydroquinone, etc., alkylated hydroxyanisoles, etc.), phenothiazine, alkyl or aryl phosphites (e.g. triethyl phosphite, triphenyl phosphite, etc.), iodine, and copper salts (e.g., $CuCl_2$, $CuBr_2$, $CuSO_4$, $Cu(PO_3)_2$, CuO, etc.). Since the efficiency of some of the cited inhibitors is enhanced by the presence of oxygen, it is advantageous, where appropriate, to sparge air or oxygen through the reaction mixture.

The esterification can be carried out with up to 90 wt. percent, preferably up to 50 wt. percent, of an inert solvent which will form an azeotrope with water generated during the reaction, thus facilitating removal of the water and displacement of the reaction equilibrium toward product. Examples of such solvents are benzene, toluene, xylene, chlorobenzene, pentane, hexane, heptane, octane, cyclopentane, cyclohexane, methylcyclohexane, dichloromethane, chloroform, carbon tetrachloride, ethylene chloride, trichloroethylene, perchloroethylene, trifluorotrichloroethylene, 3-methyl-2-butanone, methyl tert-butyl ketone, etc.

The ratio of acid to alcohol used in the esterification reaction can vary considerably, ranging, for example from 10:1 through 1:10, on an equivalent basis, with preferred levels ranging from 5:1 to 1:5.

The reaction is continued until either all of the desired hydroxyl groups or all of the desired acid groups have been esterified as measured by standard analytical procedures. Recovery of the ester is then achieved by conventional means generally involving (1) neutralization of the catalyst and, where appropriate, excess unreacted acid, (2) physical separation of the organic phase containing the product ester, and (3) removal of solvent and/or other impurities from the organic phase. As noted with the starting reactants, the product ester will be of commercial grade and should thus contain small quantities of various reaction by-products. With monofunctional alcohols, the principal impurity will be the corresponding acrylate ester, formed either by esterification of the alcohol with residual acrylic acid in the acid substrate or via reaction with the substrate at the internal ester function. When polyols are employed, the principal impurities will be materials with mixed acrylate and beta-acryloxypropionate groups. In most applications, however, low levels of such impurities are not deleterious.

As noted above, during the esterification of alcohols or polyols with AOnPA, there are formed some acrylate functional products. This is either the result of esterification of the alcohol or polyol with acrylic acid, generated in situ by the thermally induced, acid-catalyzed decomposition of AOnPA and propionyl mers or hydrolysis of AOnPA with the water of esterification, or via direct attack of the alcohol or polyol at the internal ester function of AOnPA. Thus, the propionyl mer distribution in the product will not be the same as the mer distribution in the AOnPA starting material. This phenomenon is implied in Example 1 below in which excess butyl acrylate was found in the preparation of butyl AOnPAte. Additional evidence is provided by the fact that the esterification of dodecanol with distilled AOnPA (less than 1 wt. percent AA) consistently affords 4–7 wt percent (5–9 mole percent) dodecyl acrylate.

In coating applications, it is useful to have an AOnPAte content ranging from about 2 to about 95 percent, by weight, preferably 5 to 85 percent.

The epoxides which are useful in this invention contain more than a single 1,2-epoxy group per molecule, i.e. polyepoxides. Polyepoxides may be saturated or unsaturated, aliphatic, cycloaliphatic or aromatic and can be monomeric, oligomeric, or polymeric. The formula weight per epoxide group of such polyepoxides will be from about 100 to 2000. Preferably, the polyepoxides will contain glycidyl ether or ester groups and will be liquid rather than solid. They will preferably have a formula weight per epoxide group of from about 110 to 500, more preferably from about 175 to 250. Examples of polyepoxides useful in this invention are the glycidyl polyethers of polyhydric phenols which are derived from epihalohydrin, for example epichlorohydrin, and a polyhydric phenol. Examples of such polyhydric phenols include resorcinol, hydroquinone, pyrocatechol, saligenin, phlorogluinol, bis(4-hydroxyphenol)-2,2-propane(bisphenol A), bis(4-hydroxyphenol)-2,2-butane, bis(4-hydroxyphenol)-2,1,1-methane (bisphenol F), bis(4-hydroxyphenol)-1,1-isobutane, bis(4-hydroxyphenol)-1,1-ethane, bis-2-dihydroxynapthol(methane), 4,4'-dihydroxybiphenol, and bis(4-hydroxyphenol)sulfone. Additional polyhydric phenols which may be employed are novolac resins containing more than two phenols or substituted phenolic moieties linked through methylene bridges, as well as long chain bisphenols in which the phenolic or substituted phenolic moiety are linked through an alkylene chain. Halogenated phenolic compounds may also be employed. Additional examples of useful polyepoxides include the glycidyl polyethers of polyhydric alcohols preparing by reacting a polyhydric alcohol with an epihalohydrin using an acid catalyst such borontrifluoride and subsequently treating the resulting product with an alkylene dehydrohalogenating agent. Included among the polyhydric alcohols that may be employed in the preparation of these polyepoxides are ethylene glycol, propylene glycol, diethylene glycol, 1,6-hexanediol, hexanetriol, trimethylol propane, trimethylol ethane, pentaerythritol and the like. Other polyepoxides which may be employed include the glycidyl ethers of polycarboxylic acids which are derived from an epihalohydrin and a polycarboxylic acid such as disclosed in U.S. Pat. Nos. 3,859,314 and 3,576,827. Example of polycarboxlyic acids which maybe employed include phthalic acid or its anhydride, isophthalic acid, terephthalic acid, tetrahydrophthalic acid, hexahydrophthalic anhydride, adipic acid, dimerized fatty acids, dibasic acids made from an unsaturated fatty acid, and acrylic acid and methacrylic acid. The preparation of polyepoxides is described generally in Lee and Neville, *Epoxy Resins* (McGraw Hill Book Co., 1957), pp. 3–29 and Kirk-Othmer *Encyclopedia of Chemical Technology*, Vol. 9, (John Wiley & Sons, New York, 1980), pp. 251–266.

It is preferred that polyepoxides selected from the glycidyl polyethers of polyhydric phenols, and in particular, the glycidyl polyethers of bisphenol A, be employed in the compositions of the present invention.

The AOnPAte of the hydroxyl-functional compound is blended with the polyepoxide in the weight ratio from about 5 to 100 parts of esterification product for each 100 parts of polyepoxide.

The preferred curing agents for the compositions of this invention are aliphatic polyamines having at least 3 active amine hydrogen atoms per molecule. Examples of such amines are the polyalkylene polyamines, for example, diethylene triamine, triethylene tetramine, tetraethylene pentamine and pentaethylene hexamine. Additional useful amines are ethylene diamine, tetramethylene diamine, hexamethylene diamine, xylylene diamine and the like. Adducts of such amines with acrylonitrile, acrylic acid, ethyl acrylate, butyl acrylate and the like are also useful if the adduct contains at least three active amine hydrogen atoms per molecule. Also included as useful amines are amido-amines obtained by reacting polyamines with fatty acids, both monomers and dimers, provided that the resulting amido-amine contains at least three active amine hydrogen atoms per molecule. Additional curing agents which may be employed include aromatic amines, mercaptans and anhydrides.

The polyamine is employed with the polyepoxide/AOnPAte blend in approximately equivalent ratios. That is, from about 0.75 to 1.25 amine hydrogen equivalents for each epoxy group in the polyepoxide in each acryl unsaturated group in the ester. The amine group reacts with the epoxide group opening the epoxide ring to form a substituted amine group and a hydroxyl group. The amine group adds across the double bond of the acrylate group through Michael addition to form substituted amine groups and saturated carbon-to-carbon linkage.

Depending on the intended end-use application, the compositions of the present invention may be compounded with various fillers, thickeners, reinforcing agents, pigment, solvents, dispersants, adhesion promoters, and the like, is well known in the epoxy formulation art.

The ester monomers are generally used to reduce the viscosity of a monomer/polymer system to levels required by the specific application means, such as spraying, dipping, brushing, flow coating, etc.

In the following Examples the percent yields are based on the total weight of esters formed, i.e. main products plus ester by-products.

EXAMPLE 1

Preparation of Butyl Ester of AOnPA

A mixture of 222.4 g. n-butanol (3.0 eq.), 600.0 g. of AOnPA (3.45 eq., n=1: 58%; n=0: <1%; n=2: 26%; n=3: 10%; n=4: 4%; n=5: 2%; inhibited with p-methoxyphenol and triphenyl phosphite having an average n value of 1.39), 30.0 g. p-toluenesulfonic acid monohydrate (1.589 eq.), and 600.0 g. toluene was charged to a 2000 ml. reaction vessel equipped with a thermometer, air ebullator, mechanical stirrer, condenser and Dean-Stark separator. The mixture was heated 3.0 hrs. at reflux (105° C.–115° C.) to give 57 g. of aqueous distillate. The crude product was cooled to 25° C., washed, in portions, with 20% aqueous sodium hydroxide solution, evaporated in vacuo, and filtered through diatomaceous earth to afford 642.0 g. of ester (93% yield) as a fluid, light yellow liquid (Brookfield viscosity: 8 centipoise, 25° C.). The final product contained ca. 4.6% butyl acrylate by-product.

The oligomer distribution in the final product was:

|  | % |
| --- | --- |
| butyl acrylate | 4.6 |
| dimer [n-butyl(AOnPA)] | 53.4 |
| trimer | 29.8 |
| tetramer | 11.8 |
| pentamer | 0.4 |

EXAMPLE 2

Preparation of Dicyclopentyl beta-Acryloxypropionate

A 2000 ml. four-necked flask equipped with a thermometer, mechanical stirrer, air ebullator, condenser, and Dean-Stark separator was charged with 29.4 g. purified beta-acryloxypropionic acid (0.2 mole, assay: 96%; acrylic acid: 4% average n is 0.93), 30.0 g. dicyclopentenyl alcohol (0.2 mole, distilled), 1.14 g. p-toluenesulfonic acid monohydrate (0.006 mole, 3 mole %), 50 g. heptane, and 0.009 g. hydroquinone. The Dean-Stark separator was filled with additional heptane (20 ml.) and the reaction mixture was heated to reflux 91° C.). After 2.75 hours, 3.6 g. of water had been collected, the temperature of the mixture reaching 105° C. The crude product was cooled, washed with 5% aqueous sodium hydroxide solution and distilled water, then dried over magnesium sulfate, filtered and evaporated in vacuo to afford 53.0 g. of pale yellow ester (96% yield, Brookfield viscosity: 40 cps, 25° C.) containing ca. 6.5% dicyclopentenyl acrylate by-product.

EXAMPLE 3

Tetrahydrofurfuryl Ester of AOnPA

A solution of 306.4 g. tetrahydrofurfurol (3 eq.), 600 g. the AOnPA of Example 1 (3.45 eq.), and 30.0 g. p-toluenesulfonic acid monohydrate (0.158 eq.) in 600.0 g. toluene was heated at reflux for 5.0 hrs., conversion reaching 98%. The resultant mixture was than purified as described in Example 1 to afford 730 g. of product (94% yield) with a Brookfield viscosity of 17 cps at 25° C.

EXAMPLE 4

2-Hydroxyethyl Ester of AOnPA

A 1000 ml. glass autoclave equipped with a thermometer, mechanical stirrer, sampling apparatus, pressure relief valve, and gas inlet system was charged with 432.0 g. AOnPA of Example 1 (2.48 eq.) and 7.95 g. N,N-dimethylbenzylamine (0.59 mole). The mixture was then heated with agitation, to 85° C. The reactor was sealed and ethylene oxide (147.3 g., 3.35 moles) was introduced above the surface of the liquid at such a rate as to maintain a constant pressure of 20 psig and temperature of 85° C. The ethylene oxide feed was complete in 4.0 hrs. The reaction was stirred at that temperature for an additional hour at which point titratable acid was less than 1 weight percent. After the system was vented, residual ethylene oxide was sparged from the reactor affording 548. g. of crude product (97% yield), which was then treated with AMBERYLST®15 ion exchange beads (AMBERLYST is a trademark of Rohm and Haas Company) to remove the amine catalyst and calcium oxide to neutralize unreacted acid. The purified product had a Brookfield viscosity of 46 centipoise at 25° C.

EXAMPLE 5

2-Hydroxypropyl Ester of AOnPA

A 1000 ml. reaction vessel equipped with a thermometer, condenser, and mechanical stirrer was charged with 500.0 g. AOnPA (3.41 eq.; 4.6% n=0; 86.6% n=1; 8.7% n=2, and an average n value of 0.97, inhibited with ca. 1000 ppm each phenothiazine, hydroquinone and p-methoxyphenol) 9.2 g. dimethylbenzylamine (0.068 eq., 2 eq. %), and 297.0 g. of propylene oxide (5.12 eq.). The mixture was heated at reflux for 16.0 hrs., the temperature ranging from 36° C. at the onset of the process to 70° C. at its completion. Progress of the reaction was monitored by titrations for residual acidity, the reaction being terminated when the titer decreased below 0.1 meq./g. (98% conversion). The mixture was stripped of volatiles in vacuo to afford 702 g. of crude product which was then treated with AMBERLYST 15 ® ion exchange beads (Rohm and Haas Company) to remove the amine catalyst and with calcium oxide to remove unreacted acid, yielding 600 g. of neutral product ester with a Brookfield viscosity of 50 centipoise at 25° C.

EXAMPLE 6

Ethylene Glycol Bis(AOnPAte)

A solution of 232.5 g. ethylene glycol (7.5 eq.), 1458 g. AOnPA (8.38 eq., of Example 1), and 73.0 g. p-toluenesulfonic acid monohydrate (0.384 eq.) in 1400 g. toluene was heated at reflux for 4.0 hrs., conversion reaching 98%. Purification of the resulting mixture afforded 1301 g. of product ester (90% yield) with a Brookfield viscosity of 95 centipoise at 25° C.

EXAMPLE 7

Neopentyl Glycol Bis(AOnPAte)

A solution of 107.0 g. neopentyl glycol (2.06 eq.), 389.0 g. AOnPA, (2.65 eq.; 4.6% n=0, 86.6% n=1, 8.7% n=2; inhibited with ca. 1000 ppm each phenothiazine, hydroquinone and p-methoxyphenol), 1.9 g. p-toluenesulfonic acid monohydrate (0.01 eq.), and 500 g. toluene was heated at reflux for 5.0 hrs. Purification of the resulting mixture afforded 301 g. of product ester (79% yield) with a Brookfield viscosity of 55 centipoise at 25° C.

EXAMPLE 8

Diethylene Glycol Bis(AOnPAte)

A solution of 159.0 g. diethylene glycol (3.0 eq.), 600 g. AOnPA (3.45 eq., as Example 1), 30.0 g. p-toluenesulfonic acid monohydrate (0.158 eq.), and 600 g. toluene was heated at reflux for 4.0 hrs., conversion reaching 98%. Purification of the resulting mixture afforded 560 g. of product ester (89% yield) with a Brookfield viscosity of 100 centipoise at 25° C. The acrylate titer of the product was 4.76 meq./g. as measured by mercaptan titration.

EXAMPLE 9

Trimethylolpropane Tris(AOnPAte)

A solution of 402.5 g. trimethylolpropane (9.0 eq.), 1800.0 g. AOnPA (10.35 eq., of Example 1), 90.0 g. p-toluenesulfonic acid monohydrate (0.474 eq.), and 1800 g. toluene was heated at reflux for 5.0 hrs., conversion reaching 97.5%. Purification of the resulting mixture afforded 1725 g. of product ester (95% yield) with a Brookfield viscosity of 480 cps at 25° C. The acrylate titer of the product was 4.59 meq./g. (97% of theory) as measured by mercaptan titration.

When this reaction was repeated using crude beta-acryloxypropionic acid with the composition described in Example 7, there was obtained product ester with a Brookfield viscosity of 265 centipoise at 25° C.

EXAMPLE 10

Pentaerythritol Tetra(AOnPAte)

A solution of 102.1 g. pentaerythritol (3.0 eq.), 600.0 AOnPA (3.45 eq., of Example 1), 30.0 g. p-toluenesulfonic acid monohydrate (0.158 eq.) and 600 g. toluene was heated at reflux for 5.0 hrs., conversion reaching 97.5%. Purification of the resulting mixture afforded 504 g. of product ester (89% yield) with a Brookfield viscosity of 1250 centipoise at 25° C.

EXAMPLE 11

Dipentaerythritol Hexa(AOnPAte)

A mixture of 35.9 g. dipentaerythritol (0.85 eq.,), 200 g. AOnPA (1.06 eq., of Example 1), 8.1 g. p-toluenesulfonic acid monohydrate (0.043 eq., 5 mole percent), and 200.0 g. toluene was heated at reflux (110° C.–114° C.) for 3.0 hrs. A total of 15.9 ml. water was collected during this period. The mixture was cooled, washed with aqueous sodium hydroxide solution and water, dried over magnesium sulfate, filtered, and evaporated in vacuo to give 151.4 g. of product (84% yield) as a light amber oil, Brookfield viscosity: 1700 centipoise at 25° C., with an acrylate titer of 4.53 meq./g. (97% of theory) as measured by mercaptan titration.

EXAMPLE 12

Volatility of Acrylates and AOnPAtes

Volatility data on AOnPAte esters and acrylate esters are obtained by boiling point measurements and by measurements of retention time in a gas chromatograph employing columns which reflect the volatility little influenced by the chemical nature of the material. A Varian 3700 gas chromatograph equipped with a flame ionization detector and stainless steel columns of a methyl silicone gum (OV-1) or a phenyl (50%) methyl silicone gum (OV-17) was employed. The acrylates used were the commercially available materials and the AOnPAtes were those described in previous examples; except for the one based on ethanol as the alcohol, which was made by the method of Example 1. The retention time is that of the pure compound, acrylate or beta-acryloxypropionate, resulting after separation from impurities in the gas chromatograph. The data obtained are presented in Table 1. It is readily seen that the beta-acryloxypropionates are far less volatile than the corresponding acrylates; the former have much higher boiling points and greater retention times in the gas chromatograph equipped with the same column and having the same run conditions.

TABLE 1

VOLATILITY DATA

| Alcohol | Acrylate Ester Boiling Point | Acrylate Ester Retention Time (min)[1] | Beta-Acryloxypropionate Ester Boiling Point | Beta-Acryloxypropionate Ester Retention Time (min)[1] |
|---|---|---|---|---|
| ethanol | 100° C. | 1.13[2] | 70° C. (10 mm): ca. 188° C.[5] | 2.74[2] |
| n-butanol | 146°–148° C. | 2.08[2] | 70° C. (1 mm): ca. 235° C.[5] | 3.97[2] |
| n-dodecanol | — | 4.08[3] | — | 6.45[3] |
| dicylopentenyloxy ethanol | — | 5.50[4] | — | 9.00[4] |
| ethylene glycol | — | 2.28[2] | — | 7.50[2] |
| neopentyl glycol | — | 3.35[2] | — | 7.70[2] |

[1]Varian 3700 Gas Chromatograph (F.I.D.) with CDS 111 Data System.
[2]6' × ⅛" ss column; 3% OV-1; Temperature program: 80° C. to 250° C. at 20°/min; helium flow rate: 15 ml/min.
[3]6' × ⅛" ss column; 10% OV-17; Temperature program: 100° C. to 200° C. at 20°/min; helium flow rate: 30 ml/min.
[4]4' × ⅛" ss column; 10% OV-17; Temperature program: 100° C. to 275° C. at 40°/min; helium flow rate: 100 ml/min.
[5]Estimated boiling point at 760 mm obtained with Temperature-Pressure Nomograph (Matheson Coleman & Bell).

EXAMPLE 13

Phenyl AOnPAte

A solution of 141.2 g. phenol (1.4 eq.), 300.0 g. AOnPA (1.725 eq., of Example 1), and 8.2 g. of sulfuric acid/boric acid mixture (50/50 weight percent), in 300.0 g. toluene was heated at reflux for 6.0 hrs., conversion reaching 95%. Purification of the resulting mixture afforded 311.0 g. of product ester (87% yield) with a Brookfield viscosity of 93 centipoise at 25° C.

EXAMPLE 14

Pentaerythritol Bis- and Tris-(AOnPAtes)

A solution of 150.0 g. pentaerythritol (4.4 eq.), 550 g. AOnPA (3.16 eq., of Example 1), 30.0 g. p-toluenesulfonic acid monohydrate (0.16 eq.), and 500 g. toluene was heated at reflux for 4.0 hrs., conversion reaching 87%. Purification of the resulting mixture afforded 466.0 g. of product ester (80% yield) with an average functionalization of 2.5 hydroxy groups and Brookfield viscosity of 3100 centipoise at 25° C.

In the like manner, partially esterified products were derived from trimethylolpropane and glycerol. This preparation is applicable to other polyols including other diols, triols, tetrols, etc.

EXAMPLE 15

3-Phenoxy-1,2-propandiol Bis(AOnPAte)

A solution of 150.2 g. phenyl glycidyl ether (1.0 eq.), 200.0 g. AOnPA (1.15 eq., of Example 1), 200.0 g. toluene, 4.0 g. tetrapropylammonium bromide (0.015 eq.), and 1.0 g. phenothiazine was heated at reflux for 6.0 hours. Conversion, measured by residual oxirane titer, was ca. 93%. Upon cooling, the reactor was charged with 186.0 g. of AOnPA (1.07 eq.), 150.0 g. toluene, and 10.0 g. p-toluenesulfonic acid monohydrate (0.05 eq.). The mixture was again heated at reflux. After 6.0 hrs., conversion was 90%. The product was extracted with ether and purified by washing. It had an acrylate titer of 3.8 meq./g. (theory: 4.17 meq./g.) and Brookfield viscosity of 230 centipoise at 25° C.

EXAMPLE 16

Monoacrylate/Mono-AOnPAte of Ethylene Glycol primarily 2-Acryloxyethyl beta-Acryloxypropionate)

A solution of 348.3 g. 2-hydroxyethyl acrylate (3.0 eq.), 600.0 g. AOnPA (3.45 eq., of Example 1), and 20.0 g. p-toluenesulfonic acid monohydrate (0.105 eq.) in 600.0 g. toluene was heated at reflux for 5.0 hrs., conversion reaching 98%. Purification of the resulting mixture gave 742.0 g. of product ester (91% yield) with a Brookfield viscosity of 26 centipoise at 25° C.

EXAMPLE 17

2,2-Dimethyl-3-oxopropyl Ester of AOnPA

A 200 ml. four-necked flask equipped with a nitrogen ebullator, thermometer, mechanical stirrer, condenser and Dean-Stark separator was charged with 10.2 g. (0.1 mole) hydroxypivaldehyde dimer and 50 g. toluene. The mixture was heated at reflux for 10 minutes to thermally crack the dimer and was then cooled to 80° C. To the mixture was added 20 g. of AOnPA (0.14 moles, 86.6% n=1; 4.6% n=0; 8.7% n=2; inhibited with ca. 1000 ppm each phenothiazine, hydroquinone, and p-methoxyphenol), and 0.7 g. p-toluenesulfonic acid monohydrate (0.0037 mole). The result solution was heated at reflux for 70 minutes to afford ca. 2 ml. of aqueous distillate. After washing the reaction mixture with a saturated aqueous sodium bicarbonate solution and a saturated aqueous sodium chloride solution, drying it over anhydrous magnesium sulfate, and evaporating the solvent in vacuo, there was obtained 21.4 g. of product (94% yield) as a fluid pale yellow liquid. NMR ($CDCl_3$): 9.62 delta (s, 1H, —CHO); 5.73-6.67 delta (m, 3H, —CH=$CH_2$); 4.42 delta (t, 2H, —$OCH_2CH_2CO_2$—); 4.2 delta (s, 2H, —$OCH_2C(CH_3)_2CHO$); 2.67 delta (t, 2H, —$OCH_2CH_2CO_2$—); and 1.12 delta (s, 6H, —$C(CH_3)_2CHO$).

EXAMPLE 18

Tripentaerythritol Octa(AOnPAte)

A mixture of 93.1 g. tripentaerythritol (2.0 eq.), 487 g. AOnPA (2.5 eq., of Example 1), 19.0 g. p-toluenesulfonic acid monohydrate (0.10 eq., 5 mole %), 0.9 g. hydroquinone (1000 ppm on reaction mixture), and 100.0 g. toluene was heated at reflux (116°-133° C.) for 6.5 hrs. A total of 36 ml. of water was collected during this period. The mixture was cooled, washed with aqueous sodium hydroxide solution and water, dried over magnesium sulfate, filtered, and evaporated in vacuo to give 335 g. of product (73% yield) as a brown oil, Brookfield viscosity 6900 cps at 25° C., with an acrylate titer of 4.97 meq./g. as measured by mercaptan titration.

EXAMPLE 19

1,3-Butylene Glycol Bis(AOnPAte)

A solution of 135.2 g. 1,3-butylene glycol (3.0 eq.), 600.0 g. AOnPA (3.45 eq., of Example 1), 15.0 g. p-toluenesulfonic acid monohydrate (0.079 eq.), and 600.0 g. toluene was heated at reflux for 5.0 hrs. with removal of water by azeotropic distillation. Purification of the resulting mixture afforded 550 g. of product ester (90.5% yield) with a Brookfield viscosity of 97 centipoise (25° C.).

EXAMPLE 20

(AOnPAte) of a Dodecyl Alcohol/Tetradecyl Alcohol Ethoxylate

A solution of 479.2 g. (0.4 eq.) of Macol LA-23 (mixed ethoxylates of dodecyl alcohol and tetradecyl alcohol with an average of 23 ethyleneoxy groups per mole; (Macol is a trademark of Mazer Chemicals), 120.0 g. AOnPA (0.69 eq., of Example 1), and 4.0 g. sulfuric acid (0.08 eq.) in 500.0 g. toluene was heated at reflux for 5.0 hrs. with removal of water by azeotropic distillation. Purification of the resulting mixture afforded 510 g. of product ester (94% yield), as a waxy off-white solid.

EXAMPLE 21

Esterification of 1-Dodecanol with AOnPA

A solution of 1.86 g. 1-dodecanol (0.01 eq.), 10.8 g. AOnPA (1.0 eq.; n=0: 33 wt. %; n=1: 67 wt. %; average value of n is 0.5, inhibited with 400 ppm MEHQ), and 0.02 g. p-toluenesulfonic acid monohydrate in 10 ml. of 50:50 (w/w) heptane/toluene was heated at reflux for 2.5 hrs. with azeotropic removal of water. Conversion, based on 1-dodecanol, reached 99%. After purification, the product was analyzed by gas-liquid chromatography and found to contain 84.2 wt. % dodecyl-beta-acryloxypropionate and 15.2 wt. percent dodecyl acrylate. These data indicate the substantially greater reactivity of beta-acryloxypropionic acid compared with acrylic acid in direct esterifications.

EXAMPLE 22

2-Allyloxyethyl AOnPAte

A solution of 51.1 g. 2-allyloxyethanol (0.5 eq.), 150.0 g. AOnPA (0.75 eq.; n=1; 28.6 wt. %; n=2: 23.8 wt. %; n=3: 17.9 wt. %, n=4: 13.1 wt. %; n=5: 9.5 wt. %; and n=6: 7.1 wt. %; average value of n is 2.13), 10.0 g. p-toluenesulfonic acid monohydrate (0.053 eq.), and 300 g. toluene was heated at reflux for 1.5 hrs. Purification of the resulting mixture afforded 120.0 g. of product ester (81% yield) with Brookfield viscosity of 20 centipoise (25° C.).

EXAMPLE 23

Trimethylolpropane Tris (AOnPAte)

A solution of 268.4 g. trimethylolpropane (6.0 eq.), 677.2 g. AOnPA (6.6 eq.; n=0: 46.2 wt. %; n=1: 30.2 wt. %; n=2: 14.6 wt. %; n=3: 5.6 wt. %; n=4: 3.4 wt. %; n=0.465), 30.0 g. p-toluensulfonic acid monohydrate (0.16 eq.), and 700.0 g. toluene was heated at reflux for 4.0 hrs., conversion reaching 98.0%. Purification of the resulting mixture afforded 680 g. of product ester (88% yield) with Brookfield viscosity of 195 centipoise at 25° C.

In the following examples, the epoxy resin used is Epon 828 (Shell), the diglycidyl ether of bisphenol A, epoxide equivalent weight=190, $\overline{M}_n$=380, having the structural formula:

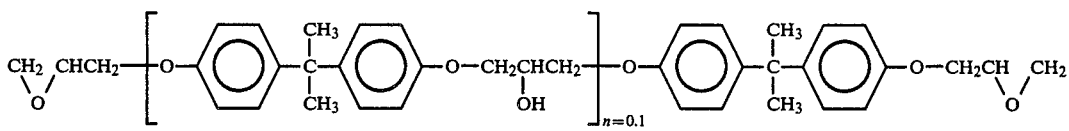

The polyamine curing agent was triethylenetetramine (TETA), equivalent weight=24, from Aldrich Chemical Co., Milwaukee, WI.

The following abbreviations are used to identify diluents:

| | |
|---|---|
| HDDA | 1,6-hexanediol diacrylate |
| TMPTA | trimethylolpropane triacrylate |
| 2-EHA | 2-ethylhexyl acrylate |
| HEA AOnPAte | ester of hydroxyethyl acrylate and AOnPA |
| THF AOnPAte | ester of tetrahydrofurfuryl alocohol and AOnPA |
| n-butyl AOnPAte | ester of n-butyl alocohol and AOnPA |
| ethyl AOnPAte | ester of ethanol and AOnPA |

EXAMPLE 24

(Comparative)-Epoxy Coating

The Brookfield viscosity (Model LVT, No. 4 spindle, 30 rpm) of Epon 828 was 18.8 Pa·s. Gardner color was 1. To 100 parts Epon 828 was added 12.7 parts TETA. Gel time (ASTM D2471-71) was 38 min. for 100 g. mass. Peak exothermic time was 41.5 min. and peak exothermic temperature was 227° C. The physical properties of the casting are listed in Table 2.

EXAMPLE 25

Epoxy/n-butyl AOnPAte

To 100 parts of Epon 828 was added 17.5 parts of n-butyl AOnPAte. Brookfield viscosity (No. 3 spindle, 60 rpm) of the resultant blend was 1.5 Pa·s. To 100 parts of the blend was added 12.59 parts TETA. Gel time after mixing in the curing agent was 30 min. for 100 g. mass. Peak exothermic time was 32.5 min. and peak exothermic temperature was 211° C. The physical properties of the casting are listed in Table 2.

EXAMPLE 26

Epoxy/n-butyl AOnPAte

To 100 parts of Epon 828 was added 33 parts of n-butyl AOnPAte. Brookfield viscosity (No. 3 spindle, 60 rpm) of the resultant blend was 0.5 Pa·s. Gardner color was 2. To 100 parts of the blend was added 12.52 parts TETA. The gel time after mixing in the curing agent was 29 min. for a 100 g. mass. Peak exothermic time was 33 min. and peak exothermic temperature was 180° C. The physical properties of the castings are listed in Table 2.

EXAMPLE 27

Epoxy/Diluent at Constant Viscosity

The amount of diluent required to reduce viscosity of Epon 828 to 1.5 and 0.5 Pa·s was added and the resin systems used for various tests. The amounts of diluents and TETA used are listed in Table 3.

TABLE 2

| | Physical Properties of Castings | | |
|---|---|---|---|
| Property | No Diluent (Ex. 24) | n-butyl AOnPAte to 1.5 Pa·s (Ex. 25) | n-butyl AOnPAte to 0.5 Pa·s (Ex. 26) |
| Barcol Hardness (ASTM D2585-75) | 35 ± 4 | 26 ± 2 | 22 ± 3 |
| Rockwell Hardness (ASTM D785-65, M-scale) | 103 ± 1 | 86 ± 1 | 39 ± 3 |
| Dielectric Constant, (ASTM D150-78) | | | |
| 60 Hz | 2.90 | 2.71 | 2.94 |
| 1 kHz | 2.77 | 2.62 | 2.75 |
| 1 MHz | 2.50 | 2.45 | 2.58 |
| Dissipation Factor, (ASTM D150-78) | | | |
| 60 Hz | 0.010 | 0.007 | 0.025 |
| 1 kHz | 0.025 | 0.011 | 0.023 |
| 1 MHz | 0.032 | 0.030 | 0.034 |
| % Water Absorption, 24 hr. (ASTM D570-77) | 0.43 | 0.31 | 0.30 |
| % Water Absorption, 34 days | 1.86 | 1.34 | 2.49 |
| % Water Absorption, 2 hr. boil | 1.03 | 1.45 | 1.88 |
| Flexural Deformation Temperature, °C. (ASTM D-648-72, 2° C./min) | 76 | 53 | 43 |
| Flexural Strength, MPa (ASTM D790-61) | 146 ± 1 | 82.8 ± 37.9 | 67.6 ± 1.4 |
| Flexural Strength, GPa (ASTM D790-61) | 3.68 ± 0.11 | 3.66 ± 0.13 | 1.88 ± 0.08 |

TABLE 3

| | Formulations to Achieve 1.5 and 0.5 Pa·s Viscosities with Various Epoxy Resin Diluents | | |
|---|---|---|---|
| Diluent | Brookfield Viscosity Pa·s | PHR of Diluent[a] | PHR of TETA[b] |
| None | 18.8 | 0 | 12.70 |
| n-butyl AOnPAte | 1.5 | 17½ | 12.59 |
| | 0.5 | 33 | 12.52 |

TABLE 3-continued

Formulations to Achieve 1.5 and 0.5 Pa · s Viscosities with Various Epoxy Resin Diluents

| Diluent | Brookfield Viscosity Pa · s | PHR of Diluent[a] | PHR of TETA[b] |
|---|---|---|---|
| HEA AOnPAte | 1.5 | 27 | 13.75 |
|  | 0.5 | 53 | 14.51 |
| THF AOnPAte | 1.5 | 28 | 12.15 |
|  | 0.5 | 52½ | 11.86 |
| ethyl AOnPAte | 1.5 | 18 | 12.88 |
|  | 0.5 | 33 | 12.99 |
| HDDA | 1.5 | 15 | 13.40 |
|  | 0.5 | 25½ | 13.83 |
| TMPTA | 1.5 | 47 | 14.99 |
|  | 0.5 | 104 | 16.78 |
| 2-EHA | 1.5 | 11½ | 12.73 |
|  | 0.5 | 20 | 12.75 |
| butyl glycidyl ether | 1.5 | 9 | 13.04 |
|  | 0.5 | 16½ | 13.29 |

[a]Parts per hundred parts of Epon 828
[b]Parts per hundred parts of Epon 828 + Diluent

EXAMPLE 28

Films of some of the compositions of Example 27 were cast on decal paper to a thickness of 0.36 mm. After gelation and hardening, the films were removed from the decal paper and aged at least a month before testing. Tensile properties were tested according to ASTM D882-79, 102 mm initial grip separation, 0.85 mm/sec. rate of grip separation. Results shown in Table 4 are averages from five test samples. Confidence interval are 95% limits.

It is noteworthy that toughness was generally higher with the AOnPA esters, and appreciably higher with n-butyl AOnPAte and HEA AOnPAte than any other diluent, including those used in the examples of U.S. Pat. No. 4,051,195.

EXAMPLE 29

Aluminum strips were bonded with some of the compositions of Example 4, and lap shear strengths measured according to ASTM D1002-72. The aluminum was "Q-Panel" 2024 T3 Alclad (Q-Panel is a trademark of the Q-Panel Company, Cleveland, Ohio. Adhesive layer thickness was 0.13 mm. with a 12.7 mm. overlap of the aluminum strips. After gelation, the bonded strips were cured 105° C./17 hr. The rate grip separation was 0.02 mm/sec. Results shown in Table 5 are averages from five test samples. Confidence intervals are 95% limits.

The AOnPA esters increased lap shear strength. HEA AOnPAte and THF AOnPAte produced the highest shear strengths for dilution to 0.5 Pa·s, higher than those produced by TMPTA and HDDA, the materials used in the examples of U.S. Pat. No. 4,051,195.

EXAMPLE 30

Impact strength of epoxy resin coatings was measured according to ASTM D256-78 (Izod-type test). A series of diluents was evaluated at levels that reduced viscosity to 1.5 and 0.5 Pa·s. TETA was used as curing agent as described in Example 27 and Table 3.

Coatings were cured by the heat of the exotherm and aging at room temperature for more than three weeks. Samples 12.7 mm. in thickness and width were cut from sheets. Results shown in Table 6 are averages from five test samples. Confidence intervals are 95% limits.

Most diluents tended to lower impact strength, more so for dilution to 0.5 Pa·s than 1.5 Pa·s. However, the THF AOnPAte imparted the only appreciable increase in impact strength, tripling it beyond the Epon 828 control.

TABLE 4

Effect of Diluent Upon Tensile Properties of an Epoxy System

| DILUENT PRODUCT | PHR | Brookfield Viscosity (#6, 20 RPM) (Pa · s) | Tensile Strength (MPa) | Extensibility (%) | Initial Modulus (GPa) | Toughness (MJ/m³) |
|---|---|---|---|---|---|---|
| None | — | 18.8 | 24.6 ± 5.5 | 0.71 ± 0.13 | 3.33 ± 0.15 | 0.105 ± 0.040 |
| butyl glycidyl ether | 9 | 1.5 | 25.6 ± 4.7 | 0.55 ± 0.12 | 4.43 ± 0.39 | 0.0814 ± 0.0303 |
|  | 16½ | 0.5 | 14.6 ± 11.5 | 0.43 ± 0.29 | 3.30 ± 0.50 | 0.0441 ± 0.0582 |
| HDDA | 15 | 1.5 | 65.1 ± 11.9 | 2.13 ± 0.58 | 3.72 ± 0.33 | 0.807 ± 0.379 |
|  | 25½ | 0.5 | 60.3 ± 6.6 | 2.47 ± 0.46 | 2.90 ± 0.26 | 0.883 ± 0.248 |
| TMPTA | 47 | 1.5 | 55.5 ± 3.3 | 2.44 ± 0.32 | 3.17 ± 0.08 | 0.821 ± 0.179 |
|  | 104 | 0.5 | 11.8 ± 7.7 | 7.92 ± 9.56 | 0.717 ± 0.897 | 0.436 ± 0.332 |
| THF AOnPAte | 28 | 1.5 | 25.0 ± 1.0 | 4.15 ± 0.32 | 1.70 ± 0.18 | 1.20 ± 1.13 |
|  | 52½ | 0.5 | 3.36 ± 0.58 | 69.9 ± 3.3 | 0.00483 ± 0.00069 | 1.19 ± 0.14 |
| n-butyl AOnPAte | 17½ | 1.5 | 46.6 ± 21.9 | 1.53 ± 1.04 | 3.76 ± 0.27 | 0.485 ± 0.546 |
|  | 33 | 0.5 | 19.2 ± 1.7 | 39.2 ± 4.3 | 0.470 ± 0.089 | 5.56 ± 0.81 |
| HEA AOnPAte | 27 | 1.5 | 74.0 ± 2.3 | 2.76 ± 0.15 | 3.86 ± 0.12 | 1.22 ± 0.11 |
|  | 53 | 0.5 | 9.42 ± 2.33 | 47.2 ± 11.3 | 0.0917 ± 0.0359 | 2.84 ± 1.00 |
| ethyl AOnPAte | 18 | 1.5 | 49.6 ± 22.8 | 1.97 ± 1.34 | 3.48 ± 0.15 | 0.696 ± 0.772 |
| 2-EHA | 11½ | 1.5 | 37.2 ± 22.9 | 1.27 ± 0.96 | 3.19 ± 0.17 | 0.329 ± 0.450 |
|  | 20 | 0.5 | 41.1 ± 5.31 | 3.55 ± 1.80 | 2.24 ± 0.46 | 1.01 ± 0.53 |

TABLE 5

Effect of Diluent Upon Lap Shear Strength of an Epoxy System

| | Lap Shear Strength (MPa.) | |
|---|---|---|
| Diluent | 1.5 Pa · s | 0.5 Pa · s |
| None | 5.50 ± 0.45 | |
| butyl glycidyl ether | 5.79 ± 0.79 | 8.46 ± 2.07 |
| TMPTA | 8.46 ± 0.65 | 11.6 ± 1.6 |
| HDDA | 8.15 ± 0.69 | 9.26 ± 0.80 |
| THF AOnPAte | 8.35 ± 0.33 | 14.2 ± 1.1 |
| n-butyl AOnPAte | 8.79 ± 0.32 | 11.1 ± 0.6 |
| ethyl AOnPAte | 7.52 ± 1.17 | 8.77 ± 1.02 |
| HEA AOnPAte | 8.70 ± 0.55 | 16.3 ± 1.8 |

TABLE 6

Effect of Diluent Upon Izod
Impact Strength of an Epoxy System

| Diluent | Izod Impact Strength (J/m Notch) | |
|---|---|---|
| | 1.5 Pa·s | 0.5 Pa·s |
| None | 27.2 ± 4.3 | |
| butyl glycidyl ether | 21.9 ± 2.7 | 11.2 ± 4.8 |
| TMPTA | 26.2 ± 4.3 | 18.1 ± 2.7 |
| HDDA | 29.4 ± 10.1 | 26.2 ± 7.5 |
| THF AOnPAte | 8.54 ± 0.00 | 83.8 ± 5.9 |
| n-butyl AOnPAte | 17.6 ± 4.3 | 23.5 ± 7.5 |

We claim:

1. A curable coating or adhesive composition comprising (1) a blend of at least one polyepoxide and the esterification product of a mixture of ethylenically unsaturated carboxylic acids of the formula $CH_2=CHCO_2(CH_2CH_2CO_2)_nH$, where the number average value of n is greater than about 0.1, and at least one hydroxy-functional compound selected from mono- and polyhydric compounds, the ratio of acid to alcohol ranging from 10:1 to 1:10, on an equivalent basis, wherein the ratio of said esterification product to said polyepoxide is from about 5:100 to 1:1 by weight, and (2) an aliphatic amine curing agent containing at least three amine hydrogens per molecule, wherein the amount of said curing agent is such that there are about 0.75 to 1.25 amine hydrogen atoms for each epoxy group of said polyepoxide and for each unsaturated acryl group of said esterification product.

2. A composition according to claim 1 wherein said polyepoxide is selected from the glycidyl polyethers of polyhydric phenols.

3. A composition according to claim 2 wherein said polyepoxide is selected from the glycidyl polyethers of bisphenol A.

4. A composition according to claim 1 wherein said hydroxy-functional compound is selected from ($C_1$–$C_8$) alkanols.

5. A composition according to claim 4 wherein said hydroxy-functional compound is n-butanol.

6. A composition according to claim 4 wherein said hydroxy-functional compound is tetrahydrofurfuryl alcohol.

7. A composition according to claim 1 wherein said hydroxy-functional compound is selected from the hydroxy-functional acrylates and methacrylates.

8. A composition according to claim 7 wherein said hydroxy-functional compound is selected from 2-hydroxyethyl acrylate, 2-hydroxyethyl methacrylate, and 3-hydroxypropyl acrylate.

9. A composition according to claim 8 wherein said hydroxy-functional compound is 2-hydroxyethyl acrylate.

10. A composition according to claim 1 wherein said curing agent is triethylene tetramine.

* * * * *